United States Patent

Hammersland et al.

[11] Patent Number: 6,138,397
[45] Date of Patent: Oct. 31, 2000

[54] METHOD AND DEVICE FOR OPERATION OF A TRAWL

[75] Inventors: Helge Hammersland, Arnatveit; Arne Tvedt, Os, both of Norway

[73] Assignee: Scantrol AS, Nesttun, Norway

[21] Appl. No.: 09/194,837

[22] PCT Filed: Jun. 2, 1997

[86] PCT No.: PCT/NO97/00136

§ 371 Date: May 27, 1999

§ 102(e) Date: May 27, 1999

[87] PCT Pub. No.: WO97/46087

PCT Pub. Date: Dec. 11, 1997

[30] Foreign Application Priority Data

Jun. 3, 1996 [NO] Norway ........................... 962273

[51] Int. Cl.[7] ............................................... A01K 73/20
[52] U.S. Cl. ............................ 43/9.1; 43/9.6; 43/9.7; 114/255; 114/253
[58] Field of Search ................... 43/9.1, 9.6, 9.7; 114/255, 253

[56] References Cited

U.S. PATENT DOCUMENTS

| | | |
|---|---|---|
| 4,246,781 | 1/1981 | Moe . |
| 4,305,571 | 12/1981 | Hystad . |
| 5,099,458 | 3/1992 | Takakii . |
| 5,347,860 | 9/1994 | Rimer . |

FOREIGN PATENT DOCUMENTS

| | | | |
|---|---|---|---|
| 0134162 | 1/1952 | U.S.S.R. | ................................... 43/9.1 |
| 0685255 | 9/1979 | U.S.S.R. | . |
| 0713553 | 2/1980 | U.S.S.R. | ................................... 43/9.1 |
| 1308305 | 5/1987 | U.S.S.R. | ................................... 43/9.1 |
| 001830234 A1 | 7/1993 | U.S.S.R. | ................................... 43/9.1 |
| 2266694 | 10/1993 | United Kingdom . | |

Primary Examiner—Michael J. Carone
Assistant Examiner—Daniel J. Beitey
Attorney, Agent, or Firm—Fulbright & Jaworski LLP

[57] ABSTRACT

There is referred to a process and an arrangement for control of one or more trawls (12, 40, 42) which are towed after a vessel (10), where the trawl(s) (12, 40, 42) are connected to the vessel by means of a number of cables (16, 14; 44, 45, 46), and where one or more devices (22, 24) contribute to maintaining the trawl(s) opening(s) outstretched during the movement through the sea and the invention is characterized in that the individual traction (FW1, FW2, FW3) in the cables (44, 45, 46) is regulated on the basis of measurements of the direction of flow (P3) of water adjacent to the trawl or the trawls.

9 Claims, 4 Drawing Sheets

METHOD AND DEVICE FOR OPERATION OF A TRAWL

The present invention relates to a process and an arrangement for operation of a trawl, that is to say to control the movements for a trawl for fishing, as is indicated in the introduction to the following process and arrangement claims, together with an application thereof. The invention has to do with being able to control and optimise the position of the trawl at seas so that fishing is made efficient. The invention especially has to do with the operation of bottom trawls.

A trawl comprises a cornet-shaped bag of a net material open at the front and closed at the rear. The front part of the trawl constitutes a funnel-shaped guide portion which conducts or controls the catch of fish, shrimps and the like backwards and into the rear portion which constitutes the trawl bag per se in which the catch is collected. A number of cables such as wires or chain links connect the trawl with a fishing vessel (a trawler). Each cable comprises extension means such as a trawl door (a paravane) for stretching out the front portion of the trawl, that is to say the entrance portion to the trawl bag. Rearmost the trawl bag can be opened in order to empty out the catch, for example when the trawl is hauled up on the deck of the vessel.

During fishing cables of the trawl are connected to their respective tension force-regulating means, such as a winch, on board the vessel, and are towed through the sea. Thereby the trawl doors feather outwards to their respective sides and the open entrance portion of the trawl is maintained stretched out.

The trawl control systems which are employed to-day control the trawl by maintaining equal tension in the cables which pull the trawl. This is done in practice by maintaining equal tension force on the winch motors.

The background for this is that it is assumed that the tension forces $FS1$ and $FS2$ (see the following FIG. 1) in the cables between the respective trawl doors and trawl, are equal if the forces in the trawl wires $FW1$ and $FW2$ out from the vessel are equal. With such a regulation there is obtained an automatic adjustment when the vessel changes course (see the FIGS. 4a and 4b) or is steered up against the wind, so that the trawl bag is maintained open. There is also obtained a certain compensation for various sea-current conditions during manoeuvring of the vessel in the sea.

Even if the tension force on the winch motors is equal, there are many conditions which cause the forces which act on the trawl to become unequal, and that leads to the trawl geometry deviating from the optimum. One of these conditions can be the friction conditions in the winches per se, a friction of 10% giving 20% difference in the cable tension when the winches rotate opposite directions. Furthermore the winding up itself of the cable on the spools can have varying quality, and the friction in the cable blocks themselves can vary.

By an optimum trawl geometry is meant that the trawl bag is adjusted approximately symmetrically about a vertical plane through the longitudinal axis of the trawl. When the direction of flow of the water into the opening portion of the trawl is approximately at right angles to a plane at right angles to the longitudinal axis of the trawl it is reckoned that the trawl has an optimum adjustment relative to the direction of flow of the water for the achievement of the most effective fishing. When the trawl geometry during towing deviates from the optimum, the trawl fishes poorer, and it can become unstable. Moreover as regards the term trawl geometry and optimum trawl geometry, the trawls are to be designed differently depending upon what type of fish it shall fish, and by the size of the vessel. The trawl producers indicate what opening the trawl must have (height and breadth), and this is designated as the optimum entrance opening for the trawl.

When the sea bottom is uneven starboard and port side trawl doors can have totally dissimilar bottom contact, and leads to different tension forces $FS1$ and $FS2$ in the trawl, even if the tensions $FW1$ and $FW2$ respectively in the cables out from the vessel to the trawl doors are equally large.

When the trawl is towed over an oblique sea bottom, as is shown in FIG. 4a, the trawl doors shall be at different depths, that is to say both the trawl doors shall have bottom contact. If the cable tension in the two cables is the same one risks the lowermost trawl door 24 losing the bottom contact. In that case the force of friction becomes equal to zero, and the associated winch will draw in cable 14 until the tension in this becomes equal to the tension in the other cable 16. With that the trawl 12 becomes obliquely positioned, and can completely lose contact with the sea bottom.

The current conditions in the ocean are another factor which affects the adjustment. If the flow of water does not come directly into the opening of the trawl its side walls will be exposed to forces which affect the side walls so that the meshes are drawn together on the one side, while they are stretched on the opposite side.

All of the afore-mentioned conditions lead to wrong trawl geometry where the trawl (that is to say the entrance opening) covers a smaller area than desirable, and therefore the trawl will fish poorer. The trawl becomes unstable and gives poor bottom contact, and fish can escape under the trawl. In addition needlessly excessive fuel is used during the afore-mentioned manoeuvres.

There exist to-day a series of measuring systems which are employed to record or control the conditions in and around the trawl per se. For example sensors can be mounted for measuring the quantity of fish both in the entrance portion of the trawl an within the trawl bag itself, and for measuring the height of the entrance opening of the trawl an its speed through the sea. These systems/sensors have however no connection with the control system of the trawl/ winch, but are employed exclusively by the skipper of the vessel for assessing how much engine power has to be used, and how much fish lies in the trawl, possibly also to check that the trawl/trawl bag is not damaged.

With regard to a previous known system to control the operation of trawls through wire tension, reference is made to GB patent publication No. 2,266,694.

It is an object of the present invention to provide a novel process and a novel control system which completely eliminates the drawbacks which are mentioned above.

Thus it is an object of the invention to provide a process and a control system with which the entrance opening to a trawl, during trawling, is adjusted the whole time to the optimum so that the water flows directly into the opening mouth of the bag, as is mentioned above.

The invention is characterised by the features which are apparent from the characterising portion of the independent claim 1. Specific embodiments of the invention are indicated in the dependent claims.

The invention will now be explained further with reference to the enclosed Figures, of which FIG. 1 and in part 4 are already discussed in this description.

Figure 4B:
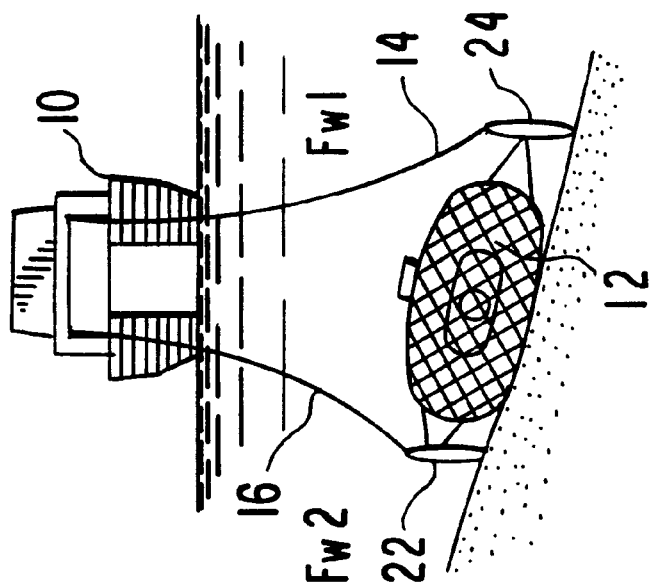
Figure 4A:
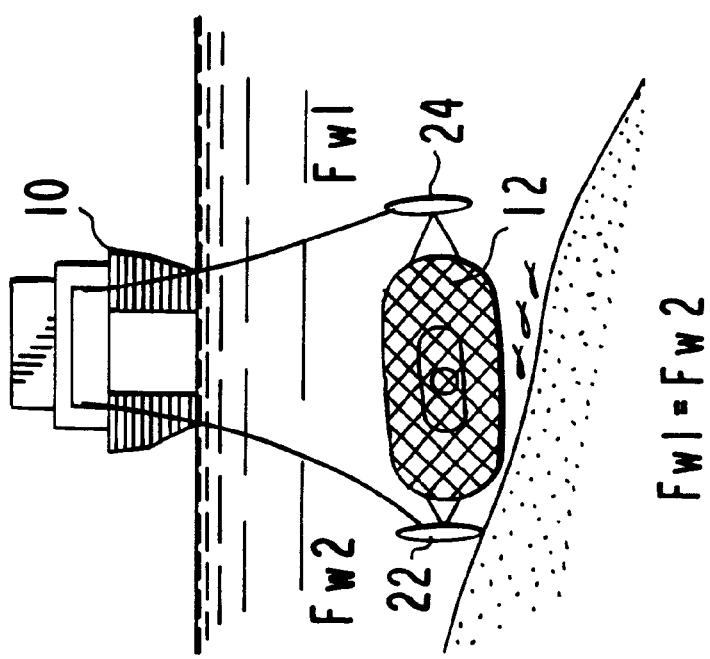

FIG. 4 shows the vessel schematically and where the trawl is towed along the sea bottom. More specifically FIG. 4a shows the situation according to the previously known technique (discussed earlier). FIG. 4b shows the situation where the control system according to the invention is used.

Figure 5:
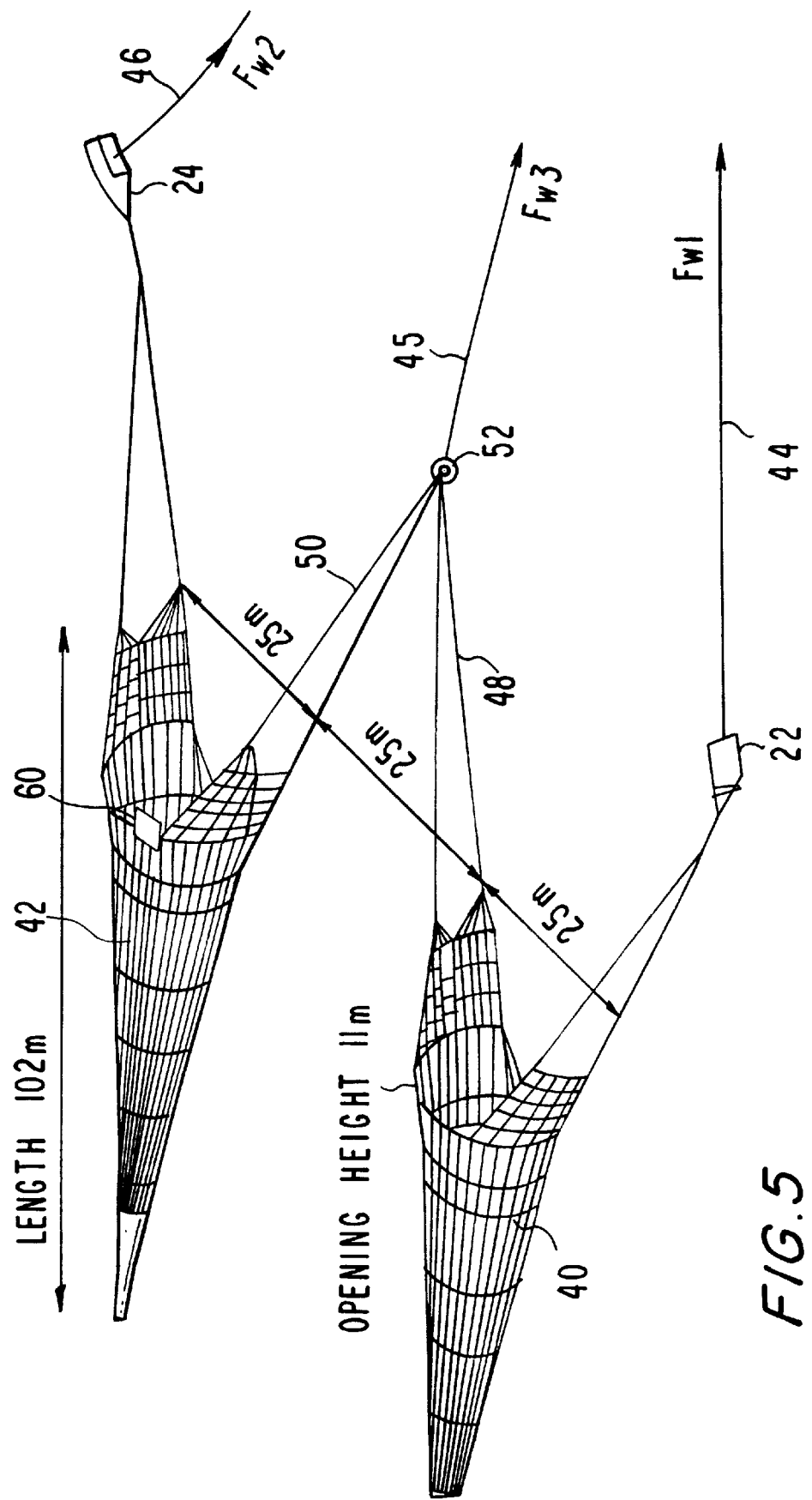

FIG. 5 shows a towing situation where the control system according to the invention is used during a common tow of two trawls situated in parallel.

Figure 1:
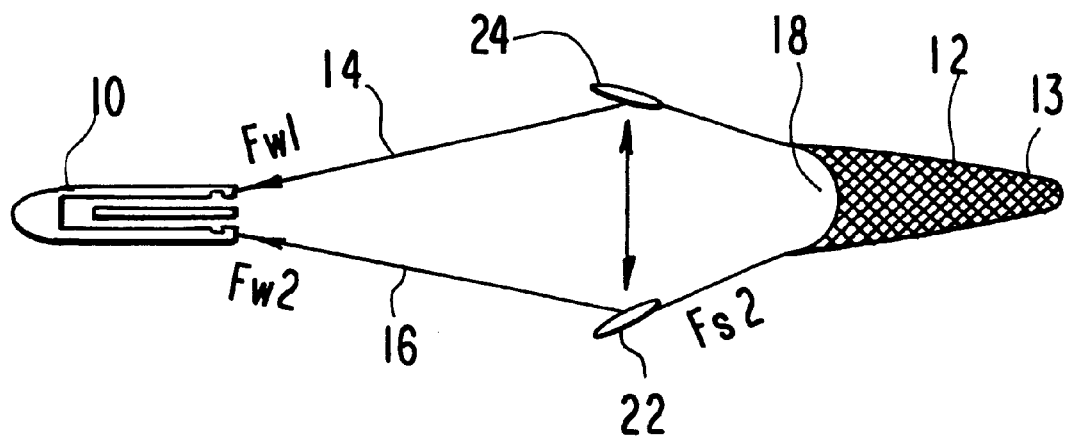
FIG. 1 shows schematically a vessel which tows a trawl after itself.
Figure 2:
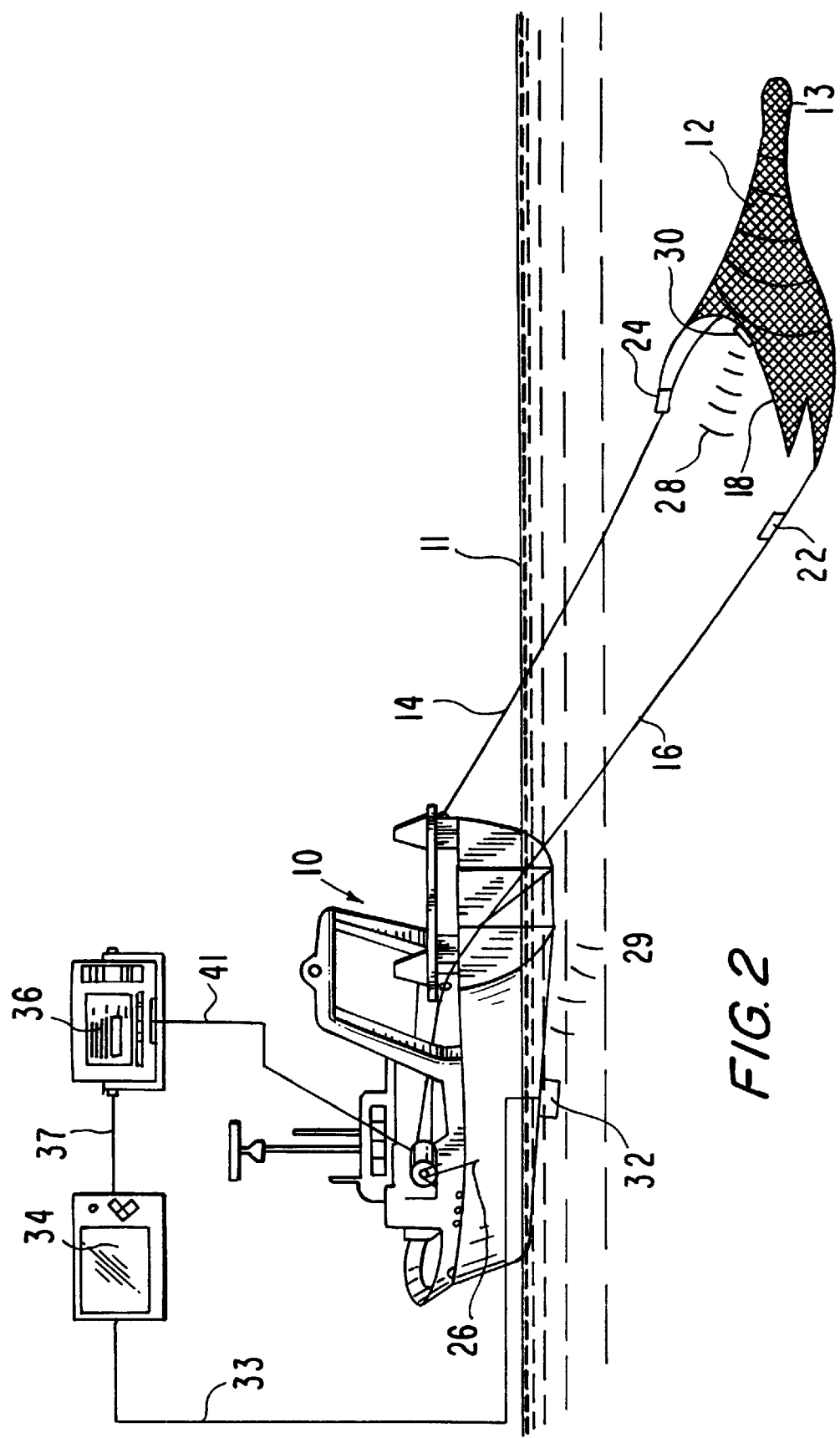
FIG. 2 shows a flow diagram of the coupling up of the control system according to the invention.

By way of introduction reference shall be made to FIGS. 1 and 2 which illustrate a vessel 10 which tows a trawl 12 after itself. The rearmost of the trawl comprises the trawl bag 13 itself in which the fish are collected. The surface of the sea is illustrated at 11. The trawl 12 is mounted in winches of the vessel 10 (a winch 26 is shown in FIG. 2) via two cables 14,16, and these are fastened to the trawl on each side of its entrance portion 18. Further the trawl entrance opening comprises stretching means, such as weights, for example lead lines in the bottom and buoyancy means in the upper part, for contributing to maintaining the opening portion stretched out. A trawl can besides have varying opening diameters (18) of from 5–6 meters and up to 30–40 meters. To each cable 14,16 there is fastened a trawl door (a paravane) 22 and 24 respectively just before the opening 18 and the trawl doors feather during the towing out to each side so that the entrance opening 18 of the trawl 12 is held stretched out. Besides the trawl 12 can be situated so deep that it sweeps the sea bottom. It will be apparent that the cables between trawl doors and trawl form a fan shape.

As is evident from FIG. 2 there is permanently mounted in connection with the entrance opening 18 of the trawl a sensor 30 or equivalent which in use can continuously record the current conditions in the form of the direction of the flow of water, in the ocean in the region adjacent to the trawl. The sensor 30, for example of the SCANMAR S4TSS type, is especially adapted for measuring the direction and speed of the sea and in towards opening 18 of the trawl. The current measurer 30 is positioned (is fixed) preferably directly to the upper side of the trawl, adjacent to the opening 18, also called "the head line". The head line can comprise a rope or a wire which passes around the periphery to the entrance opening of the trawl. The sensor 30 is adapted to both record the current conditions, plus to transmit data to a receiver in the vessel. The signals can be transmitted to the vessel by wireless and/or through a separate cable.

In the keel portion of the hull of the vessel there is mounted a hydrophone 32 (of the SCANMAR type or equivalent), which (wireless) can receive the records when these are transmitted from the sensor 30 in the form of sound waves, indicated at 28 and 29 on FIG. 2. Both the sensor and hydrophone instruments are commercially available.

The signals which are recorded by the hydrophone are transmitted through a cable (wire) 33 to a receiver unit 34, for example a signal converter of the SCANMAR RU400 type or the like in a control room (wheel house) on board and which decodes the signals. The signals are transmitted to a computer (36SCANTROL AC 501 or the like) through cable 37. The computer 36 is further coupled up via cables (wires) 41 to the two winches of which only one is shown at 26 in FIG. 2. In the invention it is the direction of flow P3 of the sea in towards the sensor 30, which is regulating parameter.

According to an aspect of the invention the program will include the winches being controlled so that the deviation from the optimum trawl adjustment becomes as small as possible, in that the sensor records the direction of the flow of water relative to a given standard (desirable) direction, based on the construction and geometry of the trawl in the outstretched position.

The information which is received from the sensor 30 is employed as follows:

The operation of each of the winches 26, that is to say the adjustment of their tension force, is regulated individually via the compute 36 so that the trawl opening 18 is set the whole time in the optimum direction, that is to say that the water flow has a direction directly into the opening 18. Then the trawl is defined as stable.

A practical adjustment and accomplishment of the operation of the system can be as follows:
1. The current conditions (plus the speed) is measured and registered in a time period of 3–5 minutes.
2. On the basis of an average measurement the computer estimates possible changes in the cable tension, and adjustment is effected in the operation of the winches.
3. A time period of 3–5 minutes is awaited so that the setting of the trawl is stabilised.

Thereafter the steps 1–3 are repeated at regular intervals. This process can also be carried out continuously and automatically.

By actively controlling the setting and contour of the trawl during towing though the sea the following advantages are obtained:

Optimum size of the entrance opening, correct trawl geometry and a stable trawl are obtained totally independent of friction in the winch and in blocks, and independently of problems with accurate rigging. By rigging is meant the design and the length of the cables which extend between trawl and trawl doors. By the invention less demands can be placed on the winches and rigging, and it becomes possible to improve the trawl geometry without large investment in winch equipment. Further correct trawl geometry and stable trawls are achieved in varying current conditions at the sea bottom and at the surface, and in varying weather conditions. Further correct trawl geometry and stable trawls are obtained on fishing in obliquely shaped bottoms (see FIG. 4) since good bottom contact is achieved and the loss of fish beneath the trawl is avoided.

When the flow of water comes directly into the trawl opening a stable trawl with correct trawl geometry is obtained. The opening of the trawl then covers a larger area, and the bottom contact is ensured along the whole of the bottom line. Further the consumption of fuel is reduced by virtue of the reduced need for towing force.

Figure 3:
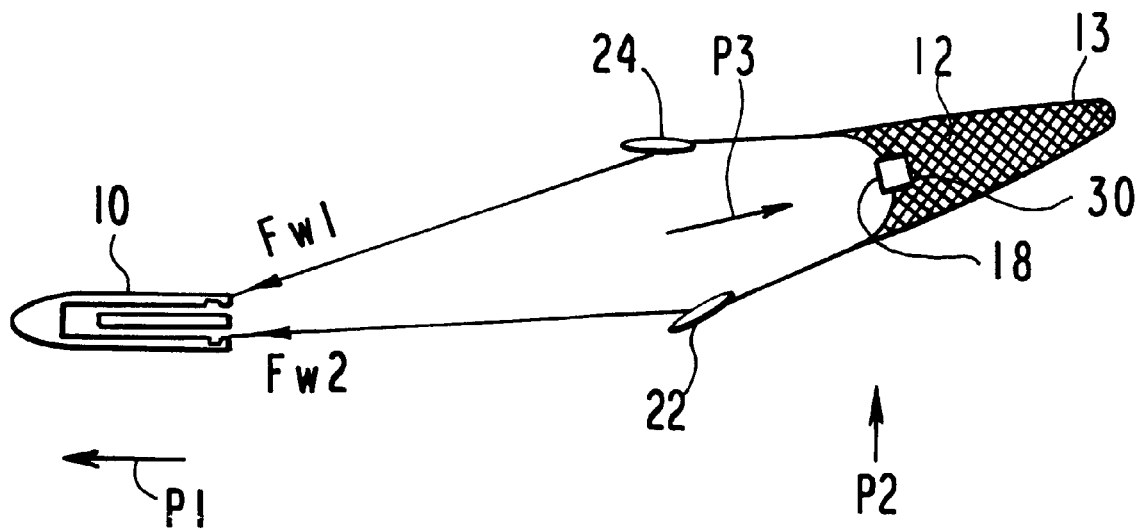
FIG. 3 shows a tow situation where the control system according to the invention is used.

In the FIGS. 3–5 there are shown a series of situations which arise during active fishing with trawl equipment, and illustrate how a trawl will perform on using the previously known solutions (also discussed in part above), and on using the present invention.

FIG. 3 shows a typical towing situation where the trawler vessel moves forwards in the sea at a given speed in the direction of the arrow P1. The trawl itself lies in the sea at a given depth beneath the ocean surface 11. The ocean current on the spot, at the depth of the trawl, is shown at P2. The resulting current of water, relative to the trawl, is shown with P3. By means of the regulating system according to the invention the tension force of the trawl winches are regulated on board so that the opening of the trawl becomes optimum, that is to say that the trawl is adapted so that the current P3 goes as far as possible in the right direction towards the trawl opening. An optimum trawl opening comprises that the direction of flow P3 of the water is approximately at right angles to a plane at right angles to the longitudinal direction/axis of the trawls. It is this direction of flow P3 which is sensed by the sensor 30. The current will then give via the outward stretching of the trawl doors 22,24 optimum opening.

FIG. 4a shows the situation with the known systems (FW1=FW2) when the sea bottom is uneven whereby starboard 24 and port side 22 trawl doors have totally dissimilar bottom contact. This easily leads to different tension forces FS1 and FS2 (indicated on FIG. 2) respectively in the trawl, even if the tensions FW1 and FW2 in the cables/the cables out from the vessel to the trawl doors are equally large. The lowermost trawl door 24 can thereby lose the bottom contact. In that case the force of friction becomes zero, and the associated winch will draw in wire 14 until the tension in this becomes equal to the tension in the other wire 16. With that the trawl 12 becomes obliquely disposed, and can lose contact with the bottom. The fish catch can thus be lost.

In FIG. 4b there is shown how the trawl will perform when the regulating system according to the invention is applied. If one of the trawl doors 24 or one side of the trawl itself rises from the sea bottom, the associated winch would, with the previously known systems by virtue of the constant cable tension FW1=FW2, pull the trawl out of its optimum position. With the system according to the invention this obliqueness is recorded by the sensor which will regulate the cable tension so that the trawl door 24 and the trawl will immediately assume their most favourable position. That is to say that the trawl door and the trawl all the time will maintain themselves for a total period correctly down to the sea bottom.

According to the invention there is thus produced a novel control system for trawl fishing which completely eliminates the disadvantages with the previously known regulating devices.

In FIG. 5 there is shown how the control system according to the invention is applied when the vessel tows two trawls 40,42 disposed essentially in parallel. As an example there are illustrated two trawls having a length of 102 meters, a vertical entrance opening height of 11 meters, horizontal breadth 25 meters, and where the horizontal distance between front portions of the bags is also 25 meters. The outer sides of the trawls are connected to their respective winches on board the vessel via cables 44,46 having trawl doors/paravanes 22,24 mounted on. The mutually adjacent bag sides are connected or bound together with wires 48,50 (each anchored to the trawl so that a fan shape is formed) at a point which comprises a heavy body or weights in the form of lead 52, which can prevent the third towing cable 45 from lifting the trawls from the bottom. The third towing cable 45 extends forwards to a third winch on board the vessel. The tension in the three wires is designated FW1, FW2 and FW3. In practice one seeks to obtain equal tension forces FW1 and FW2 in the outer cables 44 and 46 while the tension FW3 in the cable 45 is regulated by the sensor 60 based on an optimum trawl adjustment. Such a double trawl arrangement will render effective the fishing strongly in relation to necessary towing energy, and has therefore had an increasing application within trawl fishing.

However it is much more difficult to control such a double trawl than a single trawl. One is totally dependent on the point 52 of coupling together (where the weight is mounted) between the two trawls 40,42 being in the correct position relative to the two trawl doors 22,24. If not the trawls have awkward geometry (defined above) and will fish poorer.

Traditionally such a centre wire has previously been regulated in two ways.
1. The centre wire 45 is regulated so that it has a fixed length difference relative to the length for the outer wires 44,46.
2. The wire tension FW3 regulates so that it has a fixed tension relationship relative to the two outer tensions FW1, FW2.

The disadvantages with both these solutions is that it is very difficult to find the length difference (point 1) or the tension relationship (point 2) which yields the optimum trawl opening. This is due to the fact that both the sizes will vary with ocean depth, bottom conditions, current conditions and the amount of the catch in the trawl bag.

According to the invention such a double trawl system can now be controlled by arranging a current direction sensor 60 of the type which is explained above in the upper side of the one of the trawls 40,42 or that the trawls each comprise their respective separately acting sensor. The tension in the winches is regulated then based on what the sensors record. The control system is adapted then so that the length of the centre wire 45 is regulated until the water flow comes directly into the trawl opening(s). Thereby it is unnecessary to find the correct length difference/tension relationship as described above, and such as was previously usual.

When each trawl comprises a sensor, according to an alternative solution, the signals from these are combined in the control system of the vessel, and the tension force in all three cables 44,45,46 is regulated so that both the trawls are adjusted in an optimum position for an effective catch.

What is claimed is:

1. Process for control of one or ore trawls, each comprising a trawl bag, and which are towed after a vessel, where the one or more trawls via a number of cables are connected to cable tension regulating means on the vessel, and where means contribute to maintaining the opening of the trawl outstretched during the movement through the sea, wherein the individual tension in one or more of the cables is regulated on the basis of measurements of the direction of the resulting water flow adjacent to the trawl, so that the resulting water flow has direction directly towards the opening of the trawls.

2. Process in accordance with claim 1, wherein the measurement of the direction of the resulting flow of water is conducted with a sensor which is placed adjacent to the trawl.

3. Process in accordance with claim 2, wherein the sensor is arranged in the upper side of the trawl.

4. Process in accordance with claim 1 for control of two trawls which are towed mutually in parallel after a vessel where the outer sides of the trawls are connected via cables to respective cable tension-regulating means in the vessel, while the mutually adjacent trawl sides are bound together with wires at a point from which a third cable leads forward to the vessel, wherein the tractions in the three cables are mutually regulated on the basis of data from one or more sensors such that the two trawls are adjusted in optimum adjustment such that the flow of water has a direction directly towards the opening of the trawls.

5. Arrangement for control of one or more trawls having a trawl bag and which are towed after a vessel where the at least one trawl via a number of cables are connected to cable tension regulating means on the vessel and comprising trawl outstretching means for maintaining the one or more trawl openings stretched out during the movement through the sea, characterized in that a number of sensors is arranged adjacent to the trawl for measuring the direction of resulting flow of the water adjacent to the trawl, which one or more sensors is/are signal-connected to the cable tension regulating means and tension on the basis of said flow measurements so that the resulting flow of water has a direction directly towards the opening of the trawls.

6. Arrangement in accordance with claim 5, wherein in that the sensor is arranged adjacent to the trawl and is preferably arranged in the upper side of the trawl.

7. Arrangement in accordance with claim 5, wherein the sensor is adapted to transmit data as sound wave signals to a hydrophone positioned in the vessel.

8. Arrangement in accordance with one of the claim 5, wherein the sensor is adapted to transmit data through a cable.

9. Arrangement in accordance with one of the claim 5, wherein in that each of the cable-tension regulating means comprises a winch.

\* \* \* \* \*